Oct. 7, 1969 M. L. LIBMAN 3,471,843

FLEXIBLE MAGNETIC DISC MEMORY

Filed Oct. 20, 1965

INVENTOR

Max L. Libman

United States Patent Office 3,471,843

Patented Oct. 7, 1969

3,471,843

FLEXIBLE MAGNETIC DISC MEMORY

Max L. Libman, 3284 Cedar Lane, Vienna, Va. 22180

Filed Oct. 20, 1965, Ser. No. 498,260
Int. Cl. G11b 5/00, 3/00, 5/74
U.S. Cl. 340—174.1 8 Claims

ABSTRACT OF THE DISCLOSURE

A magnetic-disc memory device having a stack of flexible magnetic record discs with aligned eccentric apertures, and with a multiple reading or recording head and a drive wheel assembly located in the aligned apertures, with means for advancing any one selected disc into engagement with said drive wheel assembly so that it is rotated past said head to read or record data, the selected disc being guided by limited flexing of the disc material into said engagement without any relative axial motion between the stack of discs and the multiple head.

This invention relates to a device for recording large amounts of information, any item of which may be instantly referred to for use, alteration, erasure, or any other purpose. The device is intended to accomplish the same general purpose as punch cards generally used for record purposes, but has a number of important advantages over punch cards, one of the most important being instant access to any desired item. The main object of the invention is to provide a record device of the type above mentioned into which data can be put at very great speed, from which information can be extracted at great speed, and which provides instant availability for all items stored therein.

The typical punch card in use at present is read too slowly by the automatic card readers now in use, and such cards are fed too slowly through the reader to make full use of the modern electronic digital machines. The rate of punching such cards to store information therein is still slower. At the best, ten cards a second can be fed through a card reader, and since each card provides twelve by 88 columns, this makes available 1056 times 10 or 10,560 possible bits of information per second. Typical modern computers handle digital information at the rate of a million bits of information per second, so it will be seen that there is a large disproportion between the speeds of the two machines and the modern electronic machines cannot be used efficiently with the punch card input and output for most purposes.

It has been proposed to use magnetic tape or wire to store the results produced by electronic digital computers, and some such systems are known to be in use. These have the advantages of greater compactness than cards, as well as greater speed. It is possible to store pulses or "bits" on a tape or wire at the rate of 20,000 per second, and in the case of a tape several adjacent channels may be used simultaneously, spaced apart an eighth of an inch or less. The pulses in a channel may be packed about 200 to the inch, so that it can be seen that the information can be very compactly stored. Of course, the higher rate of pulse reading or writing, namely 20,000 per second, would require a linear rate of transfer of the tape through the reading or writing heads of over eight feet per second, but this can be achieved without too great difficulty. However, when the problem of referring to a particular item on the tape arises, it then becomes necessary to run through a large amount of tape in order to reach the particular item. This would involve a large waste of time in the typical case where the tape is used to store a large number of small items, such, for example, as are now found on a single punch card, since the tape would be constantly running back and forth as the desired items are being selected. Similarly, the problem of selecting a desired item on a punched card is also a time-consuming one, as the entire stack of cards including the desired one must be put manually into a card sorter which runs through the whole stack while selecting the desired one or ones. The present invention obviates both of these difficulties.

In the device of my invention the information is stored on a number of rotatable discs, which may be of any suitable thin sheet metal which is magnetizable, or which may be plastic discs coated with magnetic material in known fashion. A multiple reading head is provided, which consists of a number of closely stacked reading heads, of the type usually used for reading magnetic tape. These heads can be obtained an eigth of an inch wide or less, so that they can be stacked eight or more to the linear inch. If these heads are arranged or stacked along a radius of the disc which is to be read, then as the disc is rotated past the heads, they will simultaneously read any information which is magnetically stored in a series of concentric circular paths on the disc, such paths being spaced radially an eighth of an inch apart on the disc. Information can be stored on opposite sides of the disc, so that two such heads can be used. With the presently accomplished density of packing of pulses, a disc 20 inches in diameter can store as much information as at least 500 punch cards. If this disc is spun at the rate of one revolution per second, which is very conservative, it will be apparent that any item of information stored on the disc can be reached in one second. This provides a tremendous improvement in the accessibility of the information compared to the previously mentioned systems.

It will be apparent that the invention is not limited to reading heads, since writing and erasing heads can also be used with equal facility, as is well known in the art of magnetic recording. Usually two or more sets of such heads are disposed in the path of the recording medium, in this case, in the circular path on the record disc. Thus, any item can be entered on the disc in a given revolution, can be erased and changed as desired in any other revolution. Since each circular path of the disc stores as much information as several punch cards, and there are 100 such paths in a 20-inch disc, assuming the outer six inches of the disc are used, it will be apparent that many items can be treated simultaneously. Since the output of a large-scale modern digital computer is at a rate very much faster than even magnetic information can be stored in a single track, it may be desirable to use a number of tracks in parallel simultaneously in order to make better use of the capacity of the computer. It will be seen that the use of magnetic discs as proposed lends itself admirably to this purpose, due to the great flexibility of the arrangement.

The broad use of magnetic discs as above described is not the subject of my invention. It has been proposed to use such discs, a number of them being mounted on an arcuate axis, each disc having a notch therein aligned with similar notches in the other discs on said axis, a multiple head of the type described being rotatable on a central axis through the aligned notches to any one of a number of positions corresponding to the positions of the respective discs, as described in U.S. Patent No. 2,690,913 to Rabinow. When it is desired to read any particular disc, the multiple head is rotated until it lies in the notch of the desired disc, and then the disc is spun past the multiple head as described above. The head must have an indexing means and a rotating means so that it is brought into a different position for each disc. A servo-mechanism is used to rotate the multiple head. The requirement for speed and accuracy in positioning this head means that an elaborate and expensive mechanism must be used to control the movement of the multiple head. Since the head may need to be swung through a large angle, and it is necessarily of greater mass than the individual discs, it is obvious that the movement of the head will impose a greater limitation on the speed of selection than will the rotation of the discs. Furthermore, the relatively complicated mechanism for moving the head at high speed through large angles is more liable to go out of order than the simpler means which is required to spin the discs.

I eliminate the above disadvantages and provide other advantages which will become apparent as the description proceeds, by means of my invention, which includes among its objects the provision of a device which is inherently much more compact for a given capacity than the above described device. A prime object is the elimination of the complicated and expensive head moving means, which I may replace by a stationary multiple head for use with a substantial number of discs, or alternatively I may provide a limited amount of head motion through a very small distance in order to provide cooperation of a single head with a very large number of discs such as would require a large angular swing in the prior device above described. I accomplish this by stacking a number of the record discs on the same linear axis, one immediately adjacent the other, instead of spacing the individual discs a substantial distance apart as necessary in the prior device wherein individual indexing is provided. Since satisfactory discs are typically only 5/1000 of an inch thick, even with fairly loose spacing to permit individual rotation of the discs, they can be easily stacked 100 to the inch, or for example, 20 to the quarter-inch. Considering the latter example, that is, a stack of discs one quarter inch thick, and assuming a notch or aperture in each disc aligned with similar apertures in the other discs, the multiple head lying within the aperture of the stack of discs, then it will be apparent that any one disc can be rotated through the multiple head for reading. Of course, only the centrally located discs of the 1/4 inch stack will be aligned with the reading slot of the multiple head, but even the end discs of the stack will be displaced only an eighth of an inch in going into the slot, and these very thin and flexible discs are easily displaced laterally by this small amount without any noticeable hindrance to their motion. It will thus be seen that the equivalent of more than 10,000 punch cards can be provided by 20-inch diameter discs stacked no more than 1/4 inch. The provision of means for selecting and spinning any given disc of the stack is a very simple problem, as will be shown below, and one which can easily be solved by very simple and inexpensive means.

The specific nature of my invention as well as other objects and advantages thereof will clearly appear from a description of a preferred embodiment as shown in the accompanying drawing, in which.

Figure 1:
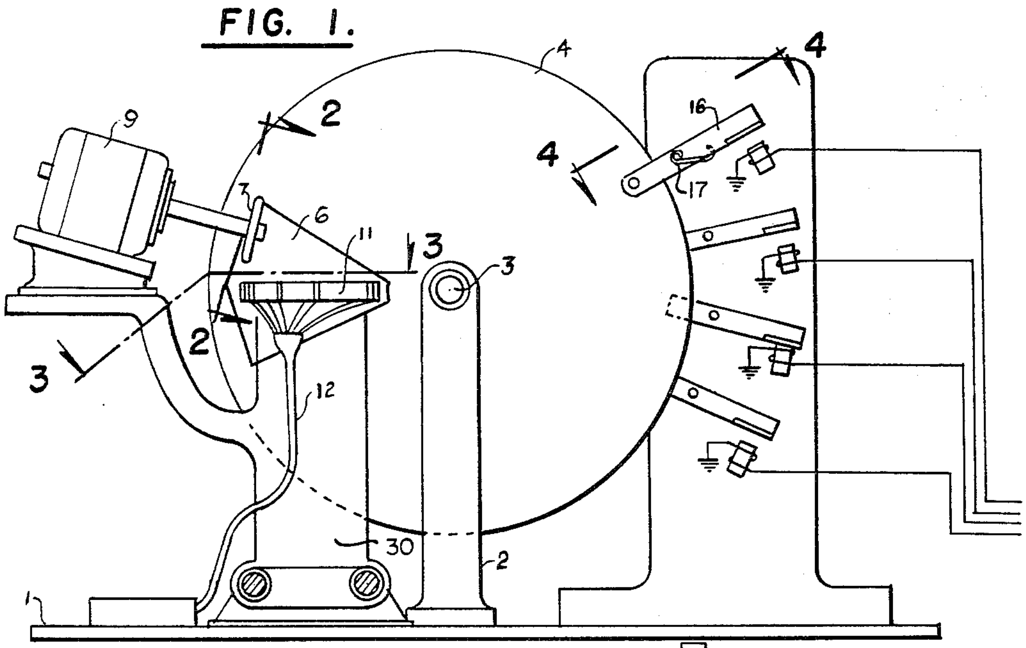
FIG. 1 is a schematic side elevational view of one embodiment of the invention.
Figures 2, 4, 5:
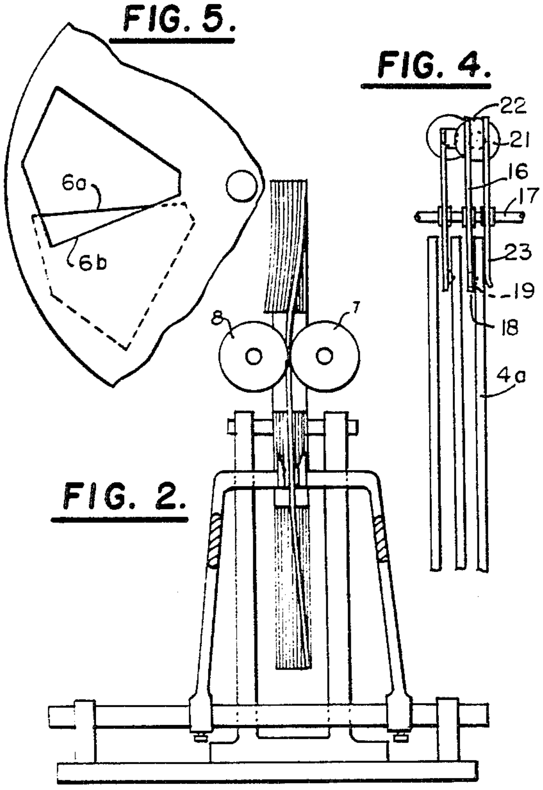
FIG. 2 is a view taken on line 2—2 of FIG. 1.
FIG. 4 is a view taken on line 4—4 of FIG. 1.
FIG. 5 is a sectional view of two adjacent discs showing the manner in which the edges of the orifices interact.

As shown in FIGS. 1 and 2, the device is mounted on a base 1 having upright standards 2 bearing a shaft 3 which supports a number of thin flexible discs 4 each having at least one surface coated with magnetic material such as is used on recording tapes. The discs are in the order of 0.005 inch thick and are preferably loosely stacked, in the order of 100 to the inch and independently mounted so that each can freely rotate relative to the others. Each disc is provided wtih an aperture 6, and all of the apertures are normally aligned so that the entire assembly of discs presents a transverse aperture in which are mounted two friction wheels 7 and 8, at least one of which is capable of being driven by a motor 9, the wheels being preferably of a soft material, at least at their outer rims, and slightly pressed together so that the motor-driven wheel drives the other wheels in the opposite direction. Since the friction wheels are rotating freely in the aperture, this will have no effect upon any of the discs, but if any one of the discs is angularly rotated counterclockwise with respect to FIG. 1 for a few degrees of rotation, it will be seen that the edge 6a (FIG. 5) of the disc which has been thus rotated will first strike a portion of the rim of the rotating friction wheels and then be guided into frictional engagement between both wheels, after which this particular disc will be rotated for substantially 360° until the aperture again is reached by the friction wheels, after which they will have no further effect upon the disc. Since the speed of the friction wheels is such that the disc is given quite a rapid rotation, in the order of perhaps 1/5 of a second for a complete rotation, the disc will have sufficient inertia to continue rotating, until its orifice is again aligned with the other orifices, at which point a detent, described below, will engage it and hold it against further rotation. This will occur with any one of the stack of discs which is sufficiently close to the common point of the two friction wheels to be within the grasp of the friction wheels, the discs being so thin and flexible that they are easily bent laterally so as to pass between the two friction wheels, laterally displacing the adjacent discs to the extent necessary, which is readily accomplished due to the flexibility of the discs and the fact that they are relaitvely loosely stacked, since the space between adjacent discs on the average is almost as great as the thickness of a disc. There will, of course, be a slight frictional resistance due to the lateral pressure of the adjacent discs on the disc being moved, but the force of the friction wheels is more than adequate to overcome this frictional resistance, and the friction between the moving disc and the adjacent ones is definitely of assistance in bringing the disc quickly to a halt at the end of its single revolution. It will be noted that the edges 6a and 6b (FIG. 5) of each aperture do not lie on radii, but are directed at such an angle that when the upper edge 6a of the rotating disc meets the lower edge 6b of an adjacent disc, it does so at such an angle that there is a shear-like sliding motion between the two edges. This has been found to be of importance, because if both edges were to lie on radii of the discs, the two edges 6a and 6b would engage simultaneously at all points, and due to the flexibility of the material, they might very well overlap at any one point, which would result in tearing or mutilation of the discs. With the described configuration, this is impossible, as the point of contact simply slides outwardly as the two edges engage, and they can never engage at more than one point.

Also extending into the common aperture provided by the stack of discs is a magnetic reading head assembly 11 comprising a stack of individual reading heads spaced as close together as possible, e.g., in the order of 1/16 inch apart, and supplied by a plurality of leads which are assembled into a cable 12 so that each head can be individually connected to a conventional external control circuit for magnetically reading or writing data onto the magnetized surface of the discs in a plurality of concentric circular paths. Stacked magnetic heads are available which are sufficiently thin so that this density of stacking of the heads can be readily achieved. As the selected disc is rotated by the friction wheels, its edge 6a passes between the heads, the top of the assembly being suitably funnelled for this purpose, and the action being helped by the shearing effect above described, since the stack of heads is radially aligned, or may even be aligned parallel to the lower edge 6b to enhance this effect if necessary. Thus, as the disc is rotated, the heads are pressed firmly against the magnetic coating with which the discs are respectively surfaced, and during this interval it is possible to either read or record digital data upon the disc as desired by standard computer output means such as are now well known. Since the inner six inches of the disc are not used, assuming a 20-inch diameter disc, the rate of speed of the innermost channel when the disc is spun is ⅕ of a second, is approximately eight feet a second, so that even the slowest channel has sufficient speed to record digital information at the rate of 20,000 bits per second.

In order to read out data from a desired disc, suitable selector means must be employed to advance that particular disc into the grasp of the friction wheels. One way of accomplishing this is illustrated in FIGS. 1 and 4, which shows a lever actuator 16 pivotally mounted on pin 17, there being one such actuator for each disc. Considering the outermost lever 16, which is visible in FIG. 1, it is provided at one end with a detent dimple 18, which frictionally engages a corresponding depression 19 in the disc when the disc is in its normal resting position shown in FIG. 1. A magnet coil 21 is provided for each disc, and when the coil is energized, it attracts an armature 22 at the end of lever 16, causing the lever to pivotally move counterclockwise with reference to FIG. 1. For the end disc 4 of the assembly shown at **4*a* in FIG. 4, a spring leaf 23 is provided which is fixed to lever 16 for pivotal motion therewith. The purpose of this is to press the thin flexible material of the disc into adequate frictional engagement with the detent 18 to provide the desired holding action. However, when lever 16 is impelled in a clockwise direction by action of the magnet 22, it carries with it associated disc 4*a* for a sufficient distance so that the edge 6*a* of that particular disc is engaged between the friction wheels. The power of the motor 9 is easily sufficient to disengage the friction detent 18, 19 and cause the disc to spin one revolution as previously described. When the disc is spun sufficiently so that edge 6*b* of the aperture becomes disengaged from the friction wheels, the rotary inertia of the disc carries it for a sufficient distance so that the detent 18, 19 is re-engaged, upon which the disc stops. The assembly is then ready for the selection of the same or any other disc for the next reading or writing procedure. If desired, each disc can be provided with a leaf spring corresponding to 23, but since this adds to the thickness of the assembly, it is preferable to provide only a single leaf spring 23 for the outermost disc of the assembly, the combined pressure of this leaf upon the adjacent discs, together with the natural resilience of these discs maintains the detents of the other discs in sufficient engagement to accomplish the desired action. Although the levers 16** are made of very thin material, they are preferably somewhat thicker than the discs, and in order to accommodate the lever assembly to the width of the stack of discs, the levers are preferably staggered vertically as shown in FIG. 1, and if necessary, some of them may also be staggered horizontally in order to get the necessary number of electromagnets and levers into the available lateral dimension. Although a particular actuating mechanism has been shown, it will be apparent that various other actuating or "kicking" mechanism may be provided to select the desired disc and give it a suitable kick so that it is engaged by the friction wheels. In the case of hand-operated business machines, where the selection data are punched in by hand, the same manual operation may also be employed to kick the desired disc into engagement by the wheels.

Figure 3:
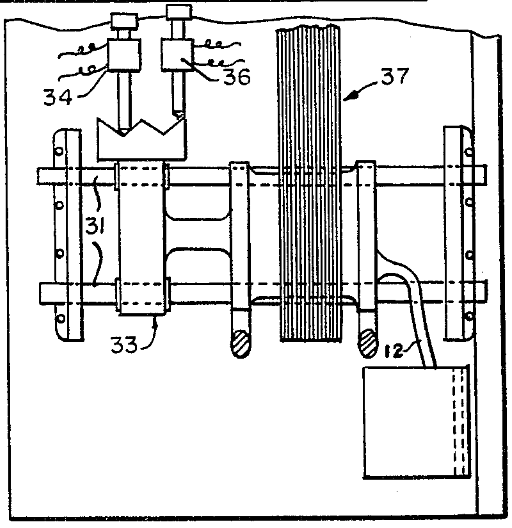
FIG. 3 is a view of a modification of the invention taken on a line corresponding to 3—3 of FIG. 1.

The above description is directed to an apparatus employing a single fixed head assembly with a stack of discs sufficiently thin so that any disc of the stack can be reached by the friction wheels. However, if desired, the capacity of the unit can be greatly increased by employing a much thicker stack of discs, and by making the friction wheels and reading head assembly laterally movable to two or more preselected positions opposite a selected portion of the stack for the reading of any disc within that selected portion. As shown in FIG. 3, the entire friction wheel and reading head assembly are mounted on a standard 30 which is slidable on two rods or rail 31 so that the assembly can be shifted laterally with respect to the stack of discs. A positioning cam assembly 33 is fixed to the standard 30, and is selectively controlled by two electromagnets 34, 36, so that each of these magnets controls the lateral position of the assembly when actuated. As shown in FIG. 3, magnet 34 has been actuated, and the assembly has therefore been shifted over to the left-hand position, where the friction wheels and discs are opposite the left-hand side of the stack 37 of the discs, which may now be twice as wide as it was before. If it is desired to read a disc in the right-hand side of the stack, magnet 36 is energized, pulling the assembly opposite the right-hand side of the stack. The particular shifting mechanism employed is merely illustrative, as will be apparent that many available types of lateral shifting mechanism may be employed, and the number of select positions is not limited to two as illustrated, but may be any desired number. This corresponds, of course, somewhat to the known mechanism in which the reading head assembly is shifted opposite the desired disc, the difference being that in the present case the assembly is shifted opposite a desired group of discs and need not be accurately positioned opposite one very thin disc, which would be utterly impossible with discs of the thickness described above. The advantage is, of course, that the number of discs which can be stacked on the shaft 3 is enormously increased by the use of the present device.

Although the disc can be coated with magnetic material on both sides, this would cause difficulties where two magnetized sides are in direct contact, and would require the magnetic information to be stored in channels slightly below the surface, requiring raised circular rims or other expedients to maintain separation between adjacent surfaces. In practice, it is simpler to use only one side of the disc and rely upon the thickness of the disc of non-magnetic material to provide the necessary magnetic separation between adjacent magnetized surfaces, as is done in the case of magnetic tape, which is coated on only one side. However, there might be some advantage in using both sides, if the concentric lines of data on both sides are staggered with respect to each other so that a channel of digital data on one face will not be opposite a channel of digital data on the adjacent face, but will lie between the nearest two such channels.

It will be apparent that the embodiments shown are only exemplary and that various modifications can be made in construction and arrangement within the scope of my invention as defined in the appended claims.

I claim:

1. In combination, (a) a plurality of thin, flexible record discs stacked in contiguous relation on a common shaft for individual rotation thereon, (b) an eccentric aperture in each disc, said apertures being normally aligned with each other to form a common aperture for the stack of discs, (c) means for selectively partially rotating any one of said discs about said shaft so that a portion of the surface of the selected disc enters into said common aperture, (d) a multiple head in said common aperture arranged to read recorded information or to record information in the form of a series of arcuate paths on said selectively rotated disc as said portion of the disc surface passes through said aperture, (e) means for guiding said selected disc into engagement with said multiple head by limited flexing of the disc without any relative axial motion between said stack as a whole and said multiple head, (f) drive means for driving said selected disc while engaged with said multiple head through a complete revolution to re-align its aperture with the common aperture.

2. The invention according to claim 1, said discs being magnetic record discs having at least one surface of magnetic material capable of receiving and retaining magnetic data.

3. The invention according to claim 2, said drive means (d) including a pair of friction wheels arranged to engage a disc between them, and means for driving at least one of said wheels, said wheels lying within said common aperture.

4. The invention according to claim 3, and further means for selectively advancing one of said discs from its normal position, wherein the apertures are aligned, for a sufficient distance so that a portion of the advanced disc is engaged by said friction wheels.

5. The invention according to claim 4, said further means including separate mechanical starter means initially engaged with each of said discs for advancing a selected disc for said sufficient distance and releasable from said disc thereafter to permit rotation of the disc by the friction wheels.

6. The invention according to claim 4, and stop means for stopping rotation of a rotated disc after it has rotated sufficiently so that its eccentric aperture is again substantially aligned with the common aperture of the stack.

7. The invention according to claim 1, and means for selectively shifting said stack of discs axially relative to said head for a predetermined distance so as to present different portions of said stack of discs to said head prior to said selective rotation.

8. A record disc of thin flexible material having at least one surface of magnetic material capable of receiving and retaining magnetic data, a central aperture in said disc about which the disc as a whole is rotatable, and a larger eccentric aperture in said disc, wholly surrounded by disc material, for receiving a multiple magnetic reading or writing head, said aperture having at least four distinct sides, at least two of said sides being opposed and lying in a generally radial direction with respect to said central aperture but with at least one of them not on a radius of the disc, whereby on relative rotation of two adjacent such discs, the opposed edges of the respective apertures of adjacent discs cannot coincide.

References Cited

UNITED STATES PATENTS

| | | | |
|---|---|---|---|
| 2,690,913 | 10/1954 | Rabinow | 340—174.1 |
| 3,229,269 | 1/1966 | Namenyi-Katz | 340—174.1 |
| 3,231,685 | 1/1966 | Kuehnle | 340—174.1 |
| 3,315,840 | 4/1967 | Tollkuhn | 340—174.1 |
| 3,160,466 | 12/1964 | Kumagai | 179—100.2 |
| 2,092,668 | 9/1937 | Goldsmith | 274—42 |
| 3,035,840 | 5/1962 | Scott | 274—42 |

TERRELL W. FEARS, Primary Examiner

V. P. CANNEY, Assistant Examiner

U.S. Cl. X.R.

274—9, 414